Dec. 12, 1933.                L. H. THOEN                1,938,986

THRESHING

Filed Nov. 24, 1930

INVENTOR
Lowell H. Thoen
BY
ATTORNEYS

Patented Dec. 12, 1933

1,938,986

UNITED STATES PATENT OFFICE 1,938,986

THRESHING

Lowell H. Thoen, Alameda, Calif., assignor to Caterpillar Tractor Co., San Leandro, Calif., a corporation of California Application November 24, 1930
Serial No. 497,778

14 Claims. (Cl. 130—27)

My invention relates to improvements in threshing machines; and the objects of my invention are, first, to provide a threshing mechanism in which is incorporated a device for separating kernels from straw; second, to provide a cylinder and concave unit with a grate.

Description of mechanism

Figure 1:
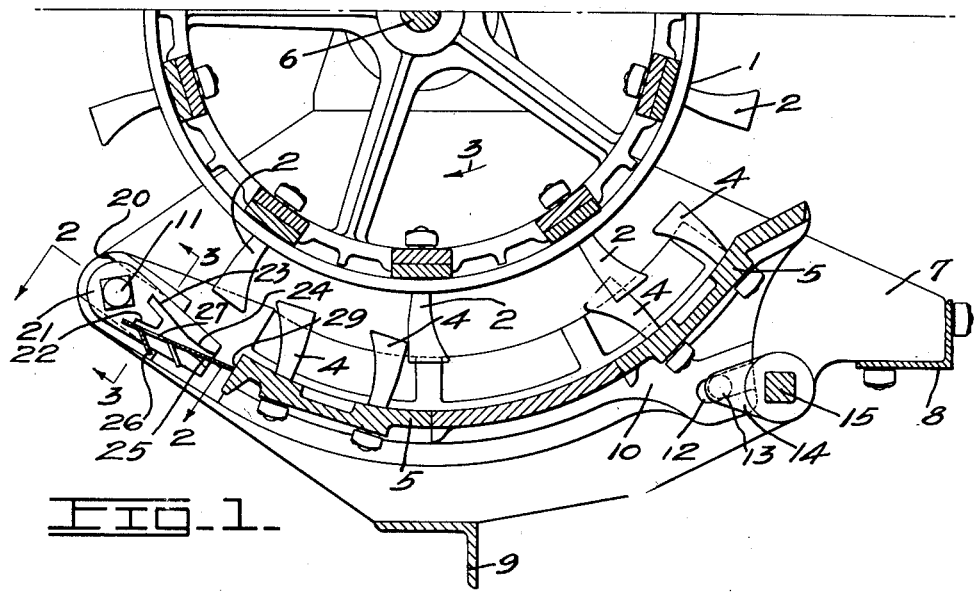
Fig. 1 is a section through the cylinder and concave unit.
Figure 2:
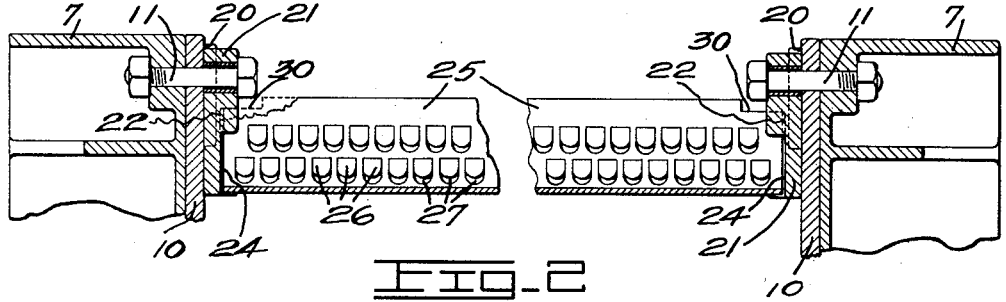
Fig. 2 is a sectional view taken on line 2—2 of Fig. 1.
Figure 3:
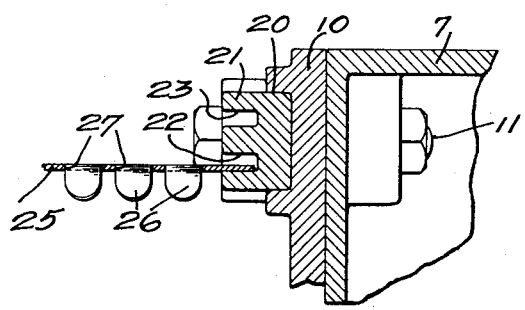
Fig. 3 is a detailed sectional view taken on line 3—3 of Fig. 1.

A cylinder of well-known construction is shown at 1 in Fig. 1, and is provided with projecting teeth 2. The cylinder is adapted to be rotated in the direction of arrow 3 so that teeth 2 pass between teeth 4 in concaves 5. Cylinder shaft 6 has bearing at its ends in supporting plates 7, which are supported on the main frame not shown. Plates 7 are interconnected by cross beams 8, 9. Concaves 5 are supported at their ends in adjustable arms 10 which are pivoted at their rear ends on bolts 11. The forward ends of the arms are slotted as at 12 to receive crank pin 13 on crank 14, which is adjusted by rotating shaft 15 by means not shown. By this construction arm 10 and concaves 5 are adjustable toward and away from cylinder 1. The rear end of arm 10 is formed to provide slot 20 in which block 21 is adapted to be retained by bolt 11. The forward end of block 21 is formed with a depression on its inner face which corresponds approximately to two intersecting slots 22, 23 which intersect adjacent the forward end of block 21 at 24. There are two blocks 21, as shown in Fig. 2, and they are adapted to receive in their depressions or slots a grate 25. Grate 25 is formed from a flat sheet of metal with portions struck out to provide openings 27 and downwardly depending lips 26 which serve as baffles. Rear corners 30 of plate 25 rest either in slot 22 or slot 23, depending upon the adjustment desired, and front corners 29 of plate 25 abut the rear edge of rearmost concave 5. In Fig. 1, plate 25 is shown as disposed in slot 22. It will readily be seen that it can be disposed in slot 23 to vary its inclination.

The unthreshed grain enters the unit from the right in Fig. 1 and is threshed by cooperation of moving teeth 2 with stationary teeth 4 to separate the kernels from the straw. The function of grate 25 is to effect a separation of the kernels from the straw. The kernels being heavier will drop through apertures 27 in plate 25, but the straw will not pass through apertures 27 because of baffles 26. In the absence of baffle 26, the straw would have a tendency to pass through apertures 27. It is to be noted that baffles 26 present an obstructing surface substantially normal to material entering aperture 27. They do not, however, serve to obstruct passage of kernels which, because of their greater weight, glance from the baffles and drop downwardly.

I, therefore, claim as my invention:

1. In a thresher, a cylinder-and-concave unit including arms and a grate, and means for supporting said grate including a pair of blocks, each block being recessed symmetrically about its longitudinal axis to seat said grate in any one of a plurality of different positions.

2. In a thresher, a cylinder-and-concave unit including arms and a grate, and means for supporting said grate including a pair of blocks, each block being recessed by two converging grooves to seat said grate in any one of a plurality of different positions.

3. In a thresher, a cylinder, concaves, an arm for supporting said concaves, a grate, and a block adapted to be positioned on said arm, said block including two grooves converging toward said concaves to provide different receptacles for said grate.

4. In a thresher, a cylinder, concaves, an arm for supporting said concaves, a grate, and a block adapted to be positioned on said arm, said block including two grooves converging toward said concaves to provide different receptacles for said grate and to position said grate between said block and said concaves.

5. In a thresher, a cylinder, concaves, an arm for supporting said concaves and including a slotted portion, a grate, and a block adapted to be positioned in said slotted portion on said arm, said block including two grooves converging toward said concaves to provide different receptacles for said grate.

6. In a thresher, a cylinder, concaves, an arm for supporting said concaves and including a slotted portion, a grate, and a block adapted to be positioned in said slotted portion on said arm, said block including two grooves converging toward said concaves to provide different receptacles for said grate and to position said grate between said block and said concaves.

7. In a thresher, a grate, and a pair of blocks for positioning said grate, each block having a pair of grooves converging toward an end of said block to seat said grate in any one of a plurality of different positions.

8. In a thresher, a grate, and a pair of blocks for positioning said grate, each block being symmetrical about a longitudinal axis and having a pair of grooves converging toward an end of said block to seat said grate in any one of a plurality of different positions.

9. In a thresher, a support including a shoulder, a grate, and blocks for positioning said grate, each block including a pair of grooves diverging from a common grooved portion to terminate in said block and provide shoulders to retain selectively said grate against said shoulder in any one of a plurality of different positions.

10. In a thresher, a support including a shoulder, a grate, and blocks slidable on said support to position said grate, each block including a pair of grooves diverging from a common grooved portion to terminate in said block and provide shoulders to retain selectively said grate against said shoulder in any one of a plurality of different positions.

11. In a thresher, a concave, a cylinder adjacent said concave, said concave including a grate provided with apertures, and baffles adjacent said apertures and extending from the underside of said grate to preclude the passage of straw through said apertures.

12. In a thresher, a concave, a cylinder adjacent said concave, said concave including a grate provided with apertures, and baffles extending from the underside of said grate, said baffles being adjacent said apertures and being inclined toward the feeder end of the thresher to preclude passage of straw through said apertures.

13. In a thresher, a concave, a cylinder adjacent said concave, said concave including a grate provided with apertures, and baffles extending from the underside of said grate and from the aperture edges adjacent the discharge end of the thresher, said baffles being inclined toward the feeder end of the thresher to preclude passage of straw through said apertures.

14. In a thresher, a concave, a cylinder adjacent said concave, said concave including a grate fixedly mounted in a predetermined position and provided with apertures, and baffles adjacent said apertures and extending from the underside of said grate to preclude the passage of straw through said apertures.

LOWELL H. THOEN.